United States Patent [19]

Lejeune et al.

[11] 4,390,429
[45] Jun. 28, 1983

[54] DECANTER FOR DECANTING A FLUID

[75] Inventors: Pierre Lejeune; Jean Serpaud, both of Grenoble, France

[73] Assignee: Societe Anonyme dite: Alstrom-Atlantique, Paris, France

[21] Appl. No.: 322,129

[22] Filed: Nov. 17, 1981

[30] Foreign Application Priority Data

Nov. 20, 1980 [FR] France ................................. 80 24627

[51] Int. Cl.³ ........................ B01D 21/14; B01D 21/24
[52] U.S. Cl. .................................... 210/519; 210/528
[58] Field of Search ............ 210/624, 626, 715, 195.3, 210/195.4, 197, 208, 219, 256, 261, 320, 519, 528

[56] References Cited

U.S. PATENT DOCUMENTS

| 1,139,024 | 5/1915 | Frank | 210/626 |
| 2,527,788 | 10/1950 | Bieker | 210/197 X |
| 2,801,007 | 7/1957 | Thompson | 210/320 |
| 2,838,180 | 6/1958 | Lawlor | 210/528 |
| 3,152,071 | 10/1964 | Kraft | 210/219 X |
| 3,236,384 | 2/1966 | Sontheimer et al. | 210/197 |
| 3,339,741 | 9/1967 | Bernard et al. | 210/195.4 |
| 3,891,557 | 6/1975 | Edgerton | 210/519 |
| 4,059,529 | 11/1977 | McGivern | 210/320 X |
| 4,127,488 | 11/1978 | Bell et al. | 210/519 |
| 4,211,657 | 7/1980 | Etlin | 210/195.4 |
| 4,278,541 | 7/1981 | Eis et al. | 210/208 X |

FOREIGN PATENT DOCUMENTS

| 1517394 | 4/1969 | Fed. Rep. of Germany . |
| 1642790 | 4/1972 | Fed. Rep. of Germany . |
| 2062724 | 6/1972 | Fed. Rep. of Germany ... 210/195.3 |
| 2635670 | 2/1978 | Fed. Rep. of Germany ... 210/195.3 |
| 1105554 | 12/1955 | France . |
| 2414939 | 8/1979 | France . |

Primary Examiner—Robert H. Spitzer
Attorney, Agent, or Firm—Sughrue, Mion, Zinn, Macpeak and Seas

[57] ABSTRACT

A decanter for decanting a fluid charged with solid particles, said decanter comprising a first decanting tank (1°) equipped with a sludge scraper system (4, 5, 6, 7) to scrape the sludge at the bottom of the tank said decanter having at least one second sludge bed type tank (12), at least one side wall (13) of the second tank being inclined and one wall (2) thereof being common with said first tank, said common wall having a first set of openings (14) located near its bottom and thus forming a first communication path with the first tank, and a second set of openings (15) at a higher level, said second set of openings forming a second communication path with the first tank, the decanter being fed with fluid via a manifold (17) located at the top of the second tank, this manifold being pierced with a plurality of holes (18) to which pipes (19) are connected which go down into the neighborhood of the bottom of said second tank.

4 Claims, 2 Drawing Figures

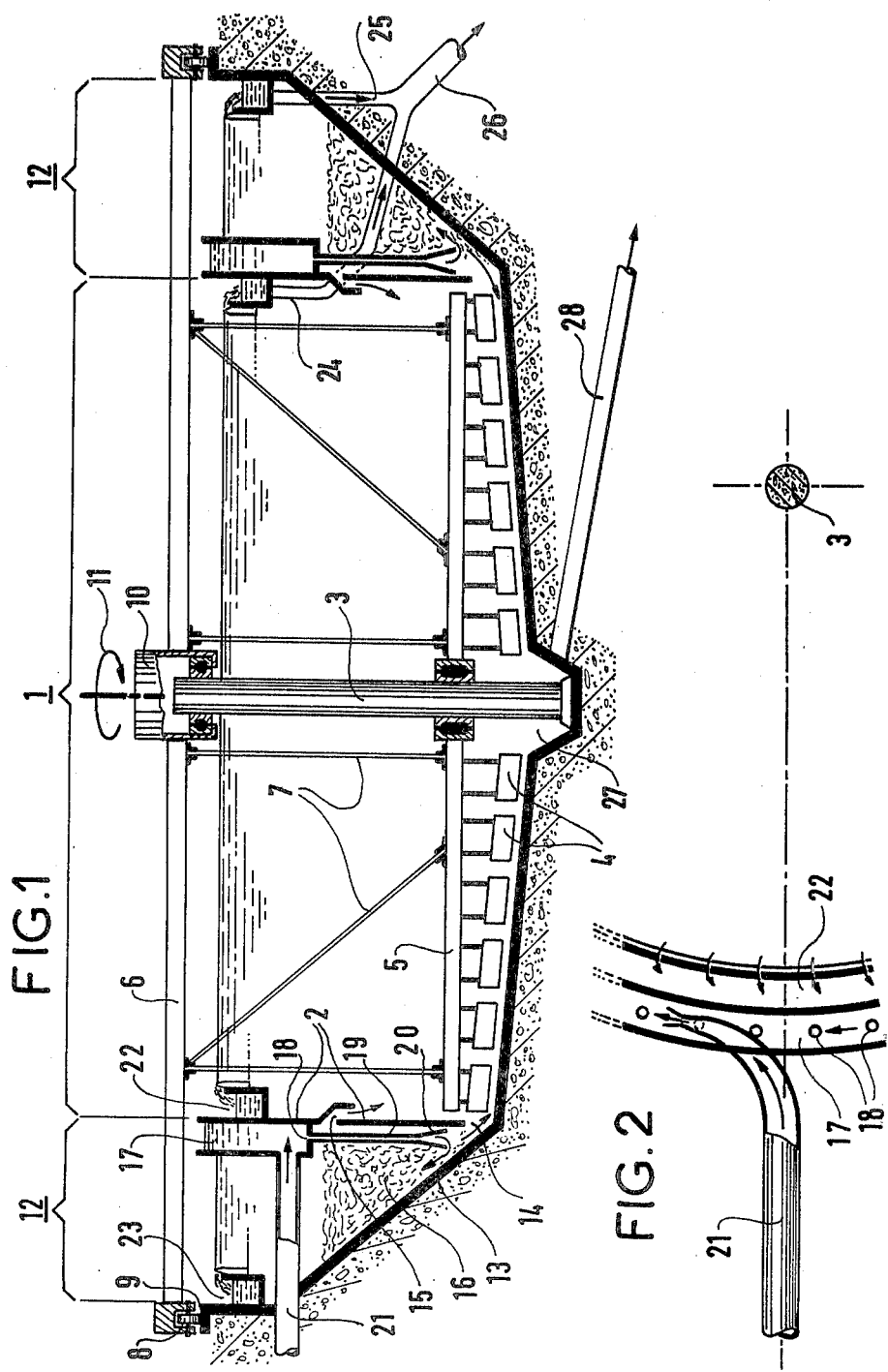

DECANTER FOR DECANTING A FLUID

The present invention relates to a decanter for decanting a fluid charged with solid particles.

BACKGROUND OF THE INVENTION

German patent application Ser. No. DE-A 1642 790 describes an installation for decanting water, which installation associates two different types of tank. A first, central tank for decanting and thickening sludge, and a second annular tank of the sludge bed type. This association is advantageous when very great volumes of water are to be treated. Tanks of the first type decant slowly and, to treat liquid at a high flow rate, they need to be of very large area while tanks of the conical sludge bed type are prohibitively tall when liquid is to be treated at a high flow rate.

However, the installation described in the abovementioned patent application requires a system for scraping the sludge in the sludge bed type tank and a system for pumping the sludge from the sludge bed type tank towards the central decanting and sludge thickening tank.

Preferred embodiments of the present invention avoid the need to use these systems by establishing proper natural drainage of the sludge from the sludge bed type tanks into the central tank.

SUMMARY OF THE INVENTION

The invention therefore provides a decanter for decanting a fluid charged with solid particules, said decanter comprising: a first decanting tank equipped with a sludge scraper system to scrape the sludge at the bottom of the tank; and a second sludge bed type annular tank surrounding said first tank; at least one side wall of the annular tank being inclined and one wall thereof being common with said first tank; said common wall having a first set of openings located at an intermediate level between the bottom and the liquid surface to form a first communication channel to the first tank; said second tank having an overflow volume; the decanter being fed with fluid via a manifold located at the top of said second tank; communication means being provided between the bottom of the manifold and the neighbourhood of the bottom of the second tank; wherein said common wall has a second set of openings near its bottom said openings forming a second communication channel to the first tank, and wherein said first tank also has an overflow volume.

Thus, sludge is properly removed towards the central portion without making use of a recirculation pump. It must be observed that, to achieve this purpose, the overflow volume of the first tank is large enough to ensure discharge from the second tank towards the first tank thus entraining the mud.

According to one particular embodiment, said communication means consist of a plurality of holes pierced in the bottom of the manifold with rectilinear pipes connected to said holes, said pipes going down into the bottom of the second tank, and their lower ends ending in a divergent neck.

Advantageously, said inclined wall of the second tank extends to near the bottom the first tank.

Preferably, a fluid feed pipe feeds said manifold and communicates with the manifold substantially parallel to the walls thereof.

BRIEF DESCRIPTION OF THE DRAWINGS

An embodiment of invention is described by way of example with reference to the accompanying drawing in which:

FIG. 1 schematically illustrates a cross-section of the decanter in accordance with the invention; and FIG. 2 shows a detail of FIG. 1.

MORE DETAILED DESCRIPTION

The decanter includes two tanks. A first circular tank 1 is delimited by a cylindrical partition 2 and has a scraper system with a central column 3. The scraper system is constituted by scrapers 4 suspended from lower radial arms 5 which are themselves connected to upper radial arms 6 by a metal lattice-work system 7; the outer ends of the upper arms 6 are equipped with rollers 8 which bear on bearing races 9. The assembly thus formed is supported on the central column 3 by hub means 10 and conventional drive and transmission means (not illustrated) make it rotate in the direction of arrow 11. A second tank 12 surrounds the first tank. It has a triangular cross-section tapering downwards and has two side walls: a first wall constituted by the cyindrical vertical partition 2 which is therfore common to both tanks and a second wall 13 inclined like the surface of a truncated cone with its larger cross-section uppermost. The first tank 1 communicates with the second tank 12 via two sets of openings: a first set 15 is located approximately half way up the partition 2 and a second set 14 located at the base of the cylindrical partition 2.

The second tank 12 is of the so-called sludge bed type. In FIG. 1, reference 16 designates the sludge bed.

The assembly is fed with fluid to be decanted by a manifold 17 whose lower portion is pierced with holes 18 which communicate with pipes 19 whose lower ends 20 are flared frustoconically so as to slow the speed of the fluid at the outlets of the pipes thus avoiding disturbing the sludge bed. The manifold is fed with fluid to be decanted by a pipe 21 whose outlet end is deflected circumferentially so as to impart a rotating movement to the liquid in the manifold as a whole and thereby prevent deposition on the bottom of the manifold (see FIG. 2). The tank 1 also has outlets via pipes 23, 25 and 26.

During operation, dirty water arrives via the pipes 19 and filters through the sludge bed 16.

The sludge descends slowly through the openings 14 and is conveyed by the moving scrapers 4 towards the bottom 27 of the first tank from which they are removed by a pipe 28. The surface area at the top of the tank 1 is equal to the surface area at the top of the tank 12, thus 50% of the water collected is water decanted into an oveflow volume 22 for the first tank 1 and 50% is water decanted into an overflow volume 23 of the second tank 12. The openings 15 allow 50% of the water from tank 12 to pass into tank 1 and keep the sludge bed at a constant level by allowing the sludge to pour out through these openings.

The system of supply pipes 19 which communicate with the manifold 17 in the open air can be cleaned and therefore proper flow can be maintained therein.

With this decanter for an equal volume of treated liquid discharged, the dimensions of the scraper system and of the tank as a whole can be smaller than those of a decanter constituted by a tank such as the tank 1 of the decanting and scraping type. Similarly, the use of a single tank with a sludge bed such as the tank 12 soon becomes prohibitive when the discharge rate is high, because of the height to be imparted to a tank with inclined walls to obtain the necessary surface for the discharge rate.

We claim:

1. A decanter for decanting a fluid charged with solid particles, said decanter comprising:

a first circular decanting tank including a circular bottom wall inclined slightly toward the center thereof;

a sludge scraper system wholly within said first tank and mounted adjacent the circular bottom wall for scraping the sludge at the bottom of the tank and for moving said sludge toward the center of said first tank;

a second sludge bed annular tank concentrically surrounding said first tank, said annular tank being formed by an inclined wall inclining outwardly and upwardly and being connected at its bottom to said circular bottom wall of said first tank and having a vertical wall radially inwardly of said annular tank inclined wall and forming a common wall with said first tank;

an annular manifold located within said decanter, at the top of said second tank, said first and second tanks having overflow volumes to remove fluid free of solid particles from said first and second tanks;

said common wall having a first set of openings located at an intermediate level between the bottom of said second tank and the liquid surface of accumulated liquid within said first and second tanks, and a second set of openings near the bottom of said common wall for communicating said second tank to said first tank;

and wherein said manifold includes means for feeding fluid thereto including means communicating the bottom of said manifold to the bottom of said second tank in the vicinity of said second set of openings; whereby, dirty fluid fed to said annular manifold enters said second tank and passes upwardly through a sludge bed formed within said second tank to enter said first chamber through said first set of openings, while some of said dirty fluid enters said first tank through said second set of openings along with sludge which descends slowly onto the inclined bottom wall of said first tank where said sludge is conveyed by the moving scrapers towards the center of said first tank and means for removing conveyed sludge from the center of said first tank at the bottom thereof, and wherein said first set of openings permits an appreciable volume of water to pass from said second tank to said first tank to maintain the sludge bed at a constant level by allowing some sludge to pour out through said first openings with said dirty liquid.

2. A decanter according to claim 1, wherein said inclined wall of the second tank terminates beneath said common wall.

3. A decanter according to claim 2, wherein said communicating means consist of a plurality of circumferentially spaced holes piercing the bottom of the annular manifold and rectilinear pipes connected to said manifold bottom at said holes and extending vertically downwardly adjacent said common wall into the bottom of said second tank, and wherein said lower ends comprise a divergent neck opening to said inclined wall of said second tank.

4. A decanter according to claim 1, wherein a fluid feed pipe feeds said manifold and communicates with the manifold substantially parallel to the walls thereof.

* * * * *